(12) United States Patent
Bond et al.

(10) Patent No.: US 12,708,110 B2
(45) Date of Patent: Aug. 18, 2026

(54) ACTUATION VALVE AND PEST CONTROL DEVICE

(71) Applicant: Goodnature Limited, Wellington (NZ)

(72) Inventors: Craig Richard Bond, Wellington (NZ); Robert Blair Van Dam, Wellington (NZ)

(73) Assignee: Goodnature Limited, Wellington (NZ)

( * ) Notice: Subject to any disclaimer, the term of this patent is extended or adjusted under 35 U.S.C. 154(b) by 345 days.

(21) Appl. No.: 17/434,370

(22) PCT Filed: Feb. 24, 2020

(86) PCT No.: PCT/NZ2020/050015
§ 371 (c)(1),
(2) Date: Aug. 26, 2021

(87) PCT Pub. No.: WO2020/175999
PCT Pub. Date: Sep. 3, 2020

(65) Prior Publication Data

US 2022/0142145 A1 May 12, 2022

(30) Foreign Application Priority Data

Feb. 27, 2019 (NZ) ........................................ 751106

(51) Int. Cl.
*A01M 27/00* (2006.01)
*A01M 23/36* (2006.01)

(52) U.S. Cl.
CPC ............ *A01M 27/00* (2013.01); *A01M 23/36* (2013.01)

(58) Field of Classification Search
CPC ...... A01M 27/00; A01M 23/36; A01M 23/24; A01M 23/00; B25C 1/04; B25C 1/041;
(Continued)

(56) References Cited

U.S. PATENT DOCUMENTS 1,988,026 A 1/1935 Unger et al.
2,872,901 A * 2/1959 Goldring ................. B25C 1/041 91/417 R (Continued)

FOREIGN PATENT DOCUMENTS

CA 1056256 A 6/1979
CN 208708559 U 4/2019

(Continued)

OTHER PUBLICATIONS

Foreign Communication from a Related Counterpart Application, Chinese Office Action dated Sep. 27, 2022, Chinese Application No. 202080017001 filed on Feb. 24, 2020.

(Continued)

*Primary Examiner* — Darren W Ark
(74) *Attorney, Agent, or Firm* — Conley Rose, P.C.

(57) ABSTRACT

An actuation valve for a pest control device, the actuation valve including a primary valve seat; a secondary valve seat; a valve seal, a recess between the primary and secondary valve seats, and an actuation arm. The actuation valve includes primary and secondary valves. The recess is located between primary and secondary valve seats to receive gas from the primary valve and promote displacement of the valve seal from the secondary valve seat. Also provided are an actuation valve with magnetic elements, an actuation valve with a trigger, a pest control device, a piston assembly for a pest control device, and a pest control assembly.

20 Claims, 9 Drawing Sheets

(58) Field of Classification Search
CPC ......... B25C 1/042; B25C 1/043; B25C 1/047; B25C 1/048
USPC .................................. 43/77–80, 58; 227/130
See application file for complete search history.

(56) References Cited

U.S. PATENT DOCUMENTS 3,010,430 A * 11/1961 Allen ...................... B25C 1/041 92/13
3,035,268 A * 5/1962 Goldring ................. B25C 1/047 227/123
3,067,724 A * 12/1962 Jenny ...................... B25C 1/041 227/123
3,087,160 A * 4/1963 Doppelt .................... B25C 1/04 227/130
3,087,162 A * 4/1963 Saurenman ............. B25C 1/041 91/461
3,099,012 A * 7/1963 Wandel ................... B25C 1/041 227/123
3,106,134 A * 10/1963 Osborne ................. B25C 1/041 91/461
3,106,136 A * 10/1963 Langas ..................... B25C 5/16 227/123
3,169,452 A * 2/1965 Dugin ..................... B25C 1/041 91/417 R
3,170,487 A * 2/1965 Juilfs ...................... B25C 1/041 91/461
3,172,124 A * 3/1965 Kremiller ............... B25C 1/005 227/123
3,176,592 A * 4/1965 Wandel .................... B21J 15/18 91/461
3,194,324 A * 7/1965 Langas ................... B25C 1/008 227/8
3,208,353 A * 9/1965 Wandel ................... B25C 1/041 91/422
3,351,256 A * 11/1967 Readyhough .......... A43D 69/02 92/255
3,375,758 A * 4/1968 Novak .................... B25C 1/041 91/461
3,496,840 A * 2/1970 Dorney ................... B25C 1/047 267/153
3,527,142 A * 9/1970 Obergfell ................ B25C 1/041 91/461
3,561,324 A * 2/1971 Obergfell ................ B25C 1/041 91/308
4,005,811 A * 2/1977 Garaty .................... B25C 1/048 227/124
4,349,980 A * 9/1982 McKee ................. A01M 23/30 43/75
4,450,648 A * 5/1984 Pratscher .............. A01M 23/14 43/79
4,483,094 A * 11/1984 McKee ................. A01M 23/30 43/75
4,567,688 A * 2/1986 McKee ................. A01M 23/18 43/61
4,640,043 A * 2/1987 Sigler ................... A01M 27/00 43/84
4,653,221 A * 3/1987 Pratscher .............. A01M 23/14 43/79
4,838,034 A * 6/1989 Leonard .................... F17C 9/02 62/51.1
5,224,287 A * 7/1993 Knudsen ............... A01M 23/30 43/75
7,757,428 B2 * 7/2010 Lovett ................... A01M 27/00 43/77
8,251,051 B2 8/2012 Maggiore
9,468,204 B2 * 10/2016 Bond .................... A01M 23/14
9,615,566 B2 * 4/2017 Bond .................... A01M 27/00
9,752,846 B1 9/2017 Kenaley et al.
9,939,227 B2 4/2018 Maggiore
10,143,192 B2 * 12/2018 Brown .................... G01L 19/12
11,772,250 B2 * 10/2023 Hao ......................... B25C 1/06 227/130
2002/0158102 A1 * 10/2002 Patton ....................... B25C 1/06 227/8
2006/0027221 A1 2/2006 Farrell
2008/0092431 A1 4/2008 Fritzboger
2008/0135598 A1 * 6/2008 Burke ..................... B25C 1/047 227/130
2008/0236026 A1 * 10/2008 Lovett ................... A01M 27/00 43/124
2010/0108736 A1 * 5/2010 Tanaka ...................... B25C 1/08 227/10
2011/0056117 A1 3/2011 Fritzboger
2011/0296739 A1 * 12/2011 Bond .................... A01M 23/36 43/83.5
2013/0082083 A1 * 4/2013 Largo ...................... B25C 1/041 227/8
2014/0059917 A1 * 3/2014 Bond .................... A01M 27/00 43/78
2017/0001291 A1 * 1/2017 Schnell ..................... B25C 1/00
2018/0271085 A1 * 9/2018 Sørensen ............. A01M 23/38
2018/0317475 A1 * 11/2018 Redmayne .......... A01M 31/008
2021/0345597 A1 * 11/2021 Dahlgård Asp ....... A01M 27/00
2022/0330539 A1 * 10/2022 Hansen ............... A01M 23/245
2023/0029020 A1 * 1/2023 Howard ................ A01M 23/16
2023/0102968 A1 * 3/2023 Weber ................... A01M 23/36 43/77
2023/0232815 A1 * 7/2023 Sorensen ............. A01M 23/36 43/79
2023/0255190 A1 * 8/2023 Sorensen ............. A01M 23/36 43/77
2023/0323972 A1 * 10/2023 Walker .................... F16K 31/46 137/538
2023/0337657 A1 * 10/2023 Sorensen ............. A01M 23/38
2024/0208020 A1 * 6/2024 Paterson ................... B25C 5/13

FOREIGN PATENT DOCUMENTS

CN 208724763 U 4/2019
CN 209931312 U 1/2020
CN 211832593 U 11/2020
CN 112790181 A 5/2021
GB 876159 A 8/1961
GB 1530714 A 11/1978
GB 2443427 A 5/2008
GB 2536313 A 9/2016
JP 2017141932 A 8/2017
NZ 512101 A 6/2004
WO 8503201 A1 8/1985
WO WO-2010101481 A1 * 9/2010 ............ A01M 23/14
WO 2012030235 A2 3/2012
WO 2016195515 A1 12/2016
WO 202038539 A2 2/2020
WO 2020175999 A1 9/2020
WO 2020216421 A1 10/2020
WO 202158934 A1 4/2021
WO WO-2021133177 A1 * 7/2021 ............ A01M 23/16

OTHER PUBLICATIONS

Foreign Communication From a Related Counterpart Application, International Preliminary Report on Patentability dated Aug. 25, 2021, International Application No. PCT/NZ2020/050015 filed on Feb. 24, 2020.

Foreign Communication From a Related Counterpart Application, International Search Report and Written Opinion dated Jul. 31, 2020 International Application No. PCT/NZ2020/050015 filed on Feb. 24, 2020.

* cited by examiner

ACTUATION VALVE AND PEST CONTROL DEVICE

CROSS-REFERENCE TO RELATED APPLICATIONS

The present application is a filing under 35 U.S.C. 371 as the National Stage of International Application No. PCT/NZ2020/050015, filed Feb. 24, 2020, entitled "AN ACTUATION VALVE AND PEST CONTROL DEVICE," which claims priority to New Zealand Application No. 751106 filed with the Intellectual Property Office of New Zealand on Feb. 27, 2019, both of which are incorporated herein by reference in their entirety for all purposes.

FIELD OF THE INVENTION

This invention relates to pest control devices, particularly but not exclusively to pest killing devices. The invention also relates to actuation valves, gas sources and piston assemblies for pest control devices.

BACKGROUND OF THE INVENTION

Pest control devices typically include some form of trigger which actuates a powered mechanism that may kill, snare or trap the animal. Pest control devices can be used to control various pests, including mice, rats, stoats, possums, hedgehogs, cats, weasels, ferrets, squirrels and raccoons.

Given the small size of many pest animals, triggers may need to be highly sensitive to detect the relatively small forces applied by pests. Insufficiently sensitive triggers can fail to actuate the powered mechanism and may allow the animal to escape.

Traditional pest control devices, including traps and poison bait stations, often require manual checking to see if they have been visited by, and caught or killed, an animal. Often, a user will be unaware that a trap has caught an animal for a significant time. In the case of poison bait stations, the dead animal may be difficult to locate because the slow action of the poison allows it to leave the area of the bait station after consuming the poison. This may present health and hygiene risks because dead animals can attract maggots and other scavengers, can cause contamination of surroundings and can be eaten by pets.

Some pest control devices are pneumatically powered by compressed gas. These often use high-pressure, consumable gas cartridges or canisters as the source of compressed gas. In some applications, it may be desirable to use alternative sources of compressed gas.

SUMMARY OF THE INVENTION

According to an exemplary embodiment there is provided an actuation valve for a pest control device, the actuation valve including:

- a primary valve seat having a gas inlet;
- a gas outlet;
- a valve seal biased towards the primary valve seat and configured to control flow of gas from the gas inlet to the gas outlet;
- magnetic elements for biasing the valve seal against the primary valve seat; and
- an actuation arm arranged to at least partially displace the valve seal from the primary valve seat when actuated.

According to another exemplary embodiment, there is provided an actuation valve for a pest control device, the actuation valve including:

- a primary valve seat;
- a secondary valve seat;
- a valve seal biased towards the primary and secondary valve seats to form primary and secondary valves and configured to control flow of gas from the primary valve to the secondary valve and outflow of gas from the secondary valve;
- a recess between the primary and secondary valve seats to receive gas from the primary valve when the valve seal is at least partially displaced from the primary valve seat to promote displacement of the valve seal from the secondary valve seat,
- wherein displacement of the valve seal from the secondary valve seat allows outflow of gas via the secondary valve; and
- an actuation arm arranged to at least partially displace the valve seal from the primary valve seat when actuated.

Also provided is a pneumatically actuated pest control device including a source of compressed gas, a pneumatic actuator powered by the compressed gas and an actuation valve as described in one of the exemplary embodiments above.

According to another exemplary embodiment there is provided a pneumatically actuated pest control device comprising:

- a pneumatic actuator;
- a first valve to control gas flow from a first volume;
- a second valve to control gas flow from a second volume to the pneumatic actuator, the second valve including valve seat and a valve seal that separates the second volume from the pneumatic actuator when seated;
- a gas inlet to supply pressurised gas from a pressurised gas source to the second volume, wherein upon actuation of the first valve, gas flows out of the first volume via the first valve which allows the second valve to unseat the valve seal such that gas flows from the second volume to the pneumatic actuator via the second valve.

According to another exemplary embodiment there is provided a pneumatically actuated pest control device comprising:

- a pneumatic actuator;
- a first valve to control gas flow from a first volume;
- a second valve to control gas flow from a second volume to the pneumatic actuator, the second valve including valve seat and a valve seal that separates the second volume from the pneumatic actuator when seated, wherein upon actuation of the first valve, gas flows out of the first volume via the first valve which allows the valve seal of the second valve to be unseated from the valve seat of the second valve such that gas flows from the second volume to the pneumatic actuator via the second valve, and wherein the first valve is an electro-mechanically actuated valve.

According to another exemplary embodiment there is provided a pneumatically actuated pest control device comprising:

- a pneumatic actuator;
- a gas flow path to supply pressurised gas from a pressurised gas source to the pneumatic actuator;
- a pressure sensor to sense gas pressure in the gas flow path, wherein the pressure sensor is configured to sense actuation or proper functioning of the pest control device.

According to another exemplary embodiment there is provided a pressurised gas source for a pneumatically actuated pest control device, comprising:

a pressure sensor to sense gas pressure in the pressurised gas source, wherein the pressure sensor is configured to sense actuation or proper functioning of the pest control device.

According to another exemplary embodiment there is provided a pneumatically actuated pest control device including:

a source of compressed gas;

a pneumatic actuator powered by the compressed gas, wherein:

the source of compressed gas has a volume greater than 100 millilitres; and the pneumatic actuator is configured to be powered by compressed gas between 150 kPa and 450 kPa.

According to another exemplary embodiment there is provided a pneumatically actuated pest control device comprising:

a pneumatic actuator including a piston body and a bore;

a gas inlet to supply pressurised gas from a pressurised gas source to the pest control device at a pressure of between 150 kPa and 450 kPa;

a valve to control gas flow to one or more surface(s) of the piston body to cause movement of the piston body substantially in a longitudinal direction through the bore, wherein the area of the surface(s) of the piston body, to which gas is applied, orthogonal to the longitudinal direction is between 0.75 $cm^2$ and 7 $cm^2$.

According to another exemplary embodiment there is provided a pneumatically actuated pest control device comprising:

a pneumatic actuator including a piston body and a bore;

a gas inlet to supply pressurised gas from a pressurised gas source to the pest control device;

a valve to control gas flow to apply a force to the piston body to cause movement of the piston body substantially in a longitudinal direction through the bore, wherein the force applied to the piston body is between about 20 N and 200 N.

According to another exemplary embodiment there is provided a pest control device comprising:

an actuator including a piston body and a bore, the piston body configured to move along a longitudinal axis through the bore;

a trigger to trigger actuation of the actuator when contacted by a pest;

a housing including an opening to permit access to the trigger, wherein the trigger is on the opposite side of the longitudinal axis from the opening and laterally spaced from the piston body by between about 4 mm and 18 mm in a resting position.

According to another exemplary embodiment there is provided a pest control device comprising:

an actuator including a piston body and a bore, the piston body configured to move along a longitudinal axis through the bore;

a trigger to trigger actuation of the actuator when contacted by a pest;

a pest attractant, bait or lure, wherein the trigger is between the longitudinal axis and the pest attractant, bait or lure and laterally spaced from the piston body by between about 4 mm and 18 mm in a resting position.

According to another exemplary embodiment there is provided a piston assembly for a pest control device, the piston assembly comprising:

a piston body;

a base; and an extension spring, wherein the extension spring connects the piston body and the base and is located at least partially within the piston body in a resting position of the piston body, and the extension spring is configured to retract to return the piston body to the resting position after longitudinal movement of the piston body away from the base.

According to another exemplary embodiment there is provided a pest control device comprising the piston assembly as recited above.

According to another exemplary embodiment there is provided a pneumatically actuated pest control device comprising:

a pneumatic actuator;

a gas reservoir including a pump to pressurise the reservoir using surrounding air;

and a valve to control gas flow from the gas reservoir to the pneumatic actuator.

According to another exemplary embodiment there is provided a pneumatically actuated pest control device comprising:

a housing;

a pneumatic actuator within the housing;

a pressurised gas reservoir incorporated into at least part of the housing; and a valve within the housing to control gas flow from the gas reservoir to the pneumatic actuator.

According to another exemplary embodiment there is provided a pest control assembly comprising:

a gas source including a gas reservoir and a pump to pressurise the reservoir using surrounding air;

a pneumatically actuated pest control device including a pneumatic actuator and a valve to control gas flow from the gas reservoir to the pneumatic actuator; and a gas flow line connected between the reservoir and the pest control device.

According to another exemplary embodiment there is provided an actuation valve for a pest control device, the actuation valve including:

a primary valve seat;

a secondary valve seat;

a valve seal biased towards the primary and secondary valve seats to form primary and secondary valves and configured to control flow of gas from the primary valve to the secondary valve and outflow of gas from the secondary valve;

a recess between the primary and secondary valve seats to receive gas from the primary valve when the valve seal is at least partially displaced from the primary valve seat to promote displacement of the valve seal from the secondary valve seat, wherein displacement of the valve seal from the secondary valve seat allows outflow of gas via the secondary valve; and a trigger arranged to at least partially displace the valve seal from the primary valve seat when actuated.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Pest control devices may lack the sensitivity required to be reliably actuated, especially by small target animals such as mice and rats. They may also require ongoing monitoring to determine whether they are operating correctly and whether they have successfully caught or killed pests. They may also require the use of consumable gas sources.

There are thus provided pest control devices and actuation valves for pest control devices that may have improved sensitivity and/or be suitable for use with small animals such as mice and rats. Also provided are pest control devices that may reduce the need for manual checking or clearing of pest control devices. Also provided are pest control devices that may be powered by a range of pressure sources. Also provided are pest control devices and information and monitoring systems that may provide improved monitoring and supervision of pest control devices to consumers and/or pest control operators. Also provided are gas sources for pest control devices. Also provided are piston assemblies for pest control devices.

Figure 1:
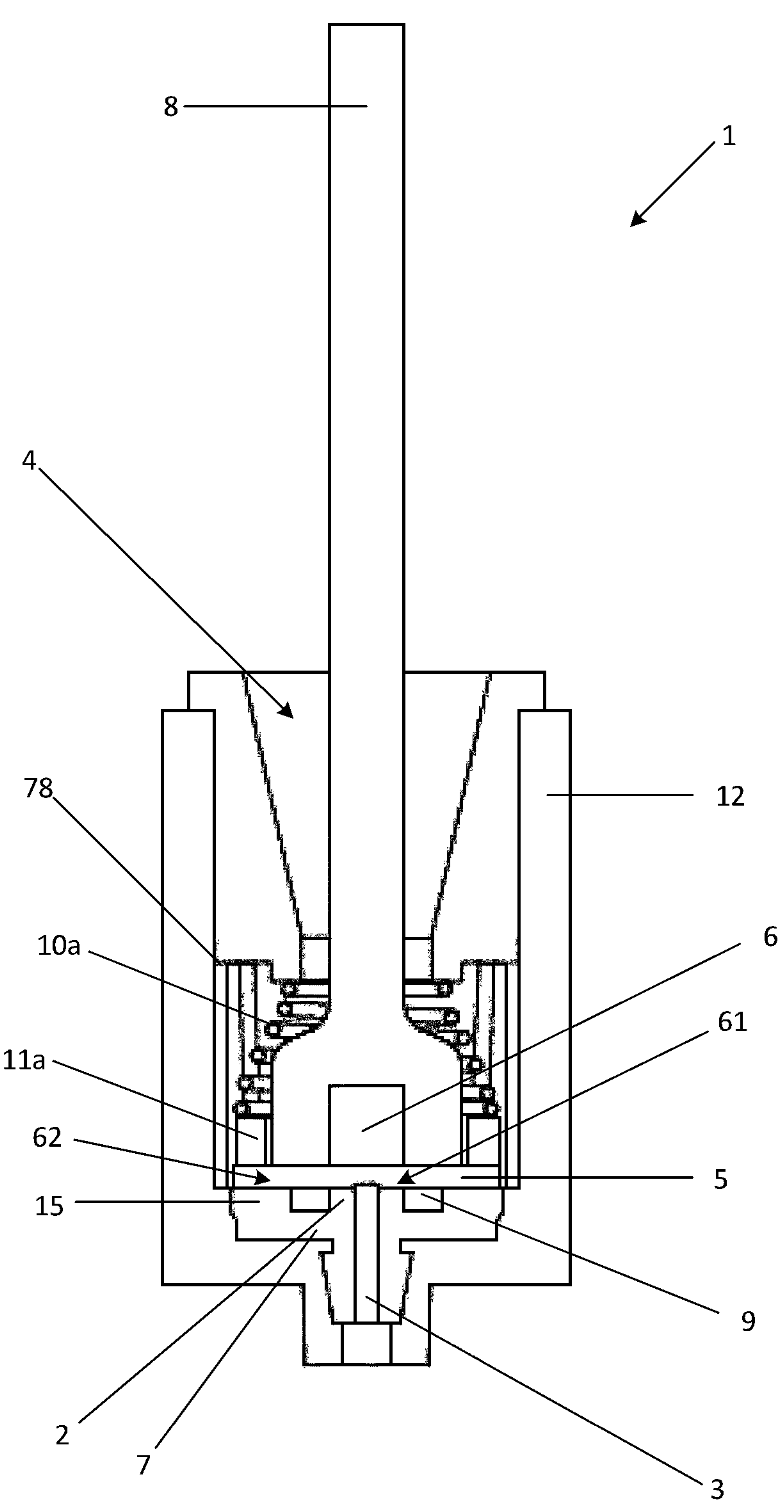
FIG. 1 shows a cross-sectional of an exemplary actuation valve.

FIG. 1 shows an exemplary embodiment of an actuation valve 1 for a pest control device. The actuation valve 1 includes a primary valve seat 2 having a gas inlet 3. The actuation valve 1 also includes a gas outlet 4 and a valve seal 5. The primary valve seat 2 and the valve seal 5 together form a primary valve 61 which controls flow of gas from the gas inlet 3 via secondary valve 62 to the gas outlet 4. It will be appreciated that various types of valve seat may be used in the actuation valve 1 depending on the application. For example, the primary valve seat 2 may have a flat surface, a rounded surface or a relatively acute “knife-edge” surface or lip. The primary valve seat 2 may be annular or it may be an elongate seat surrounding one or more slits, or any other suitable shape. In this example, the primary valve seat 2 is an annular valve seat with a knife edge. The thin “knife edge” portion of the seat 2 has a relatively small area in contact with the valve seal 5 which may improve sealing. The inlet 3 may be relatively small. In one example, the inlet is between about 0.8 mm and about 1.2 mm, for example 1.0 mm. The valve seal 5 may be formed from any material that can form a suitable seal with the valve seat(s) and allow flow of gas from the gas inlet 3 to the outlet 4 when the valve 1 is actuated. The valve seal 5 may be formed of a flexible material such as silicone, rubber, moulded thermoset or a thermoplastic elastomer, such as Hytrel. In this example, the valve seal 5 is silicone.

The valve seal 5 may be any shape suitable for sealing the primary valve and, if provided, a secondary valve. In one example, the valve seal is in the form of a disk or diaphragm. The valve seal 5 is normally biased against the primary valve seat 2 to restrict the flow of gas in the unactuated state and allow flow when actuated. The bias may also assist reseating of the valve seal after actuation. The bias may be provided by magnetic elements, one or more springs, gas pressure, a solenoid or other suitable means. The bias is preferably provided by attraction between magnetic elements. Magnetic elements may be particularly advantageous because of their force profile—the attractive force between magnetic elements decreases rapidly with increasing separation. This may allow rapid unseating of the valve seal 5 during actuation. In one example, the magnetic elements include one or more permanent magnets 6. The permanent magnet(s) 6 can be placed at the back of the valve seal 5 (the side opposite the valve seat) and/or in the region of the valve seat 2. The magnetic elements may also include one or more paramagnetic or ferromagnetic materials. In a preferred combination, the magnetic elements include a permanent magnet 6 at the back of the valve seal 5 and a stainless steel base 7 forming the primary valve seat 2 and/or a secondary valve seat 15.

The actuation valve 1 also includes an actuation arm 8 that can serve to actuate the valve when contacted. This can at least partially displace the valve seal 5 from the primary valve seat 2. There are various arrangements of the actuation arm 8 suitable for displacing the valve seal 5 from the primary valve seat 2. For example, the actuation arm 8 can rest against the back of the valve seal 5, may be connected, directly or indirectly, to the valve seal 5, or may bear on the side of the valve seal 5 to exert a sideways force on it. The actuation arm 8 may be connected to one or more of the biasing elements. For example, the actuation arm may be connected to one or more springs or magnetic elements. In a preferred arrangement, the actuation arm 8 is connected to a permanent magnet 6 which provides a bias against the seal 5 by the force between this permanent magnet 6 and stainless steel of the base 7. The permanent magnet may be held in a magnet holder or may be connected directly to the actuation arm 8.

The actuation arm 8 may be formed from various materials depending on the application. The actuation arm 8 may be made from plastic, carbon fibre, spring wire or other suitable material. The actuation arm 8 is preferably formed from a lightweight material. The actuation arm 8 preferably has a low total mass. This may reduce the likelihood of the actuation valve 1 actuating due to vibrations and other motion displacing the actuation arm 8 and hence the valve seal 5 because the low inertial mass and moment of inertia of the actuation arm 8 will cause relatively small forces and torques under linear and rotational accelerations, respectively, which will be less likely to overcome the biasing force(s) on the valve seal 5. In a preferred embodiment, the actuation arm 8 may be a lightweight plastic rod.

The actuation arm 8 may be configured to move by tilting, translating longitudinally or laterally, or some combination of these movements to displace the valve seal 5 from the primary valve seat 2. This may allow the actuation valve 1 to be actuated in response to different forces applied to the actuation arm 8 at different points and in different directions, for example tilting, pushing or pulling of the arm 8, depending on the configuration of the pest control device and type/behaviour of target pest. In a preferred arrangement, the actuation arm 8 is configured to primarily tilt to displace the valve seal 5 when a lateral force is applied to the actuation arm 8. This may allow the valve seal 5 to be displaced upon application of a relatively low lateral force on the actuation arm 8 by taking advantage of the natural lever formed by a long part of actuation arm 8 to which the transverse force is applied and a shorter portion of the actuation arm 8 at which the bias is applied. When tilted, the actuation arm 8 may partially or fully overcome the bias that biases the valve seal 5 against the primary valve seat 2. This may result in displacement of the valve seal 5 due to gas pressure being applied to the valve seal 5 in the region of the inlet 3.

The actuation valve 1 can be configured to actuate upon application of a suitable force to the actuation arm 8. The level of force required to actuate the valve can be configured by, for example, adjusting one or more of the length of the actuation arm, strength and/or type of the biasing elements, position of the biasing element(s), lengths of the relevant lever arms of the actuation arm, and so on. The force required for actuation may depend on the application and target species. In one example, the actuation valve is configured to actuate upon application, to the actuation arm, of a force between about 3 grams and about 12 grams. This range may be suitable for small target species such as mice. In one example, the actuation valve is configured to actuate upon application, to the actuation arm, of a force between about 10 grams and about 50 grams. This range may be suitable for somewhat larger target species such as rats.

The actuation valve 1 may include a secondary valve 62 formed by a secondary valve seat 15 and the valve seal 5. In this arrangement, the primary valve 61 controls flow of gas from the gas inlet 3 and the secondary valve 62 controls flow of gas to a gas outlet 4. It will be appreciated that there may be many possible arrangements of the primary and secondary valves 61, 62. For example, the valves may be arranged sequentially along an elongate flow path or line. There may also be further valves or other flow controllers or recesses intermediate the primary and secondary valves 61, 62. In a preferred embodiment, the secondary valve 62 surrounds the primary valve 61 such that gas flowing radially out from the primary valve 61 may flow to the secondary valve 62 which controls further flow of the gas to the outlet 4.

The secondary valve seat 15 may have a flat surface, a rounded surface and/or include a relatively acute "knife edge". The secondary valve seat may be annular, or it may be an elongate seat surrounding one or more slits, or any other suitable other shape. The secondary valve seat may partially or fully surround the primary valve seat.

Figure 2:
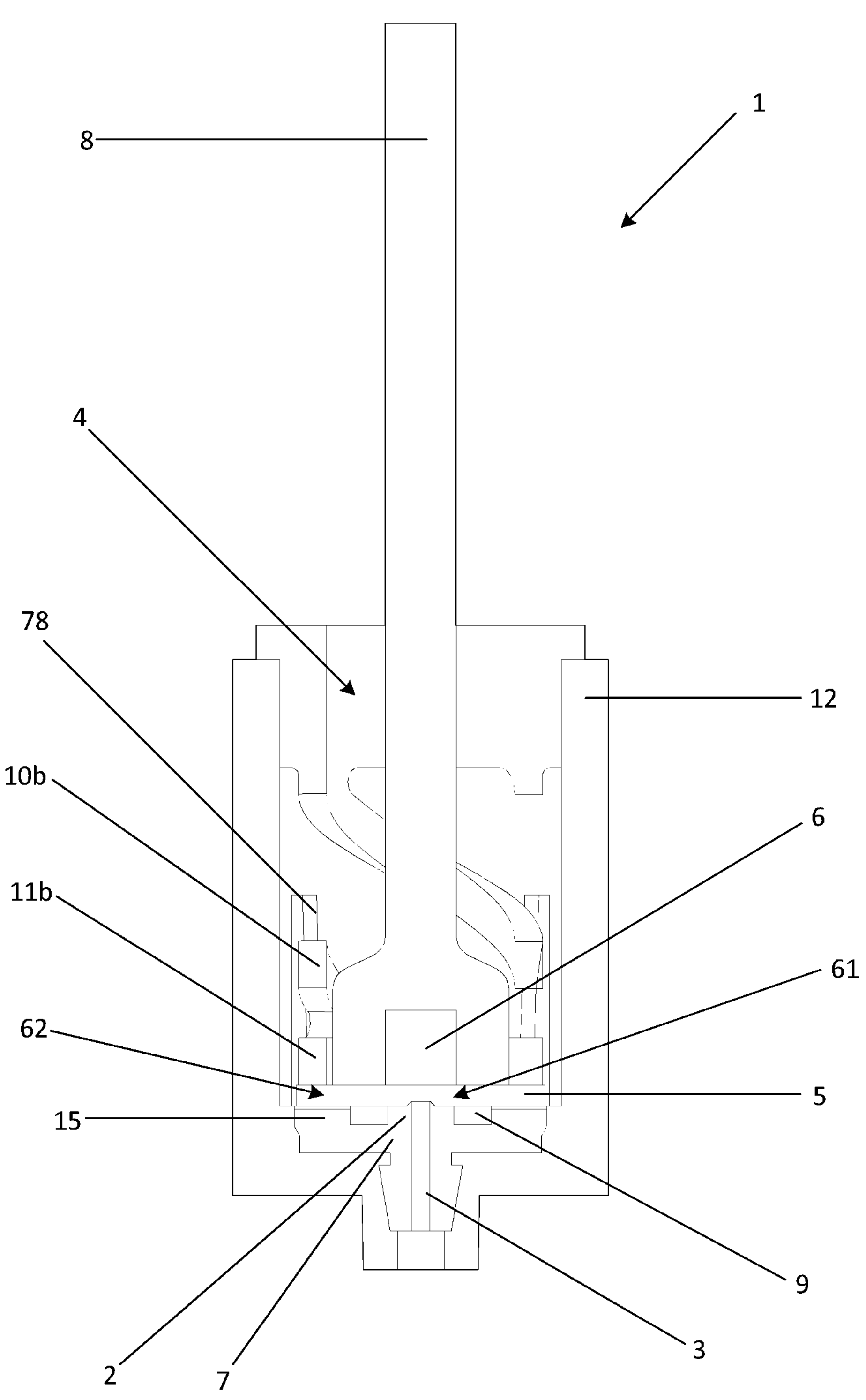
FIG. 2 shows a cross-sectional view of an alternative exemplary actuation valve.

One or more biasing elements may be provided to bias the valve seal 5 against the secondary valve seat 15. The bias may also assist reseating of the valve seal 5 after actuation. The biasing element(s) may be provided by one or more springs, one or more magnetic elements, gas pressure, a solenoid or other suitable biasing elements. In this example, the biasing element(s) includes a spring 10*a*. The spring 10*a* may be provided around the actuation arm 8. The spring 10*a* may apply its bias near the outer edge of the valve seal 5. The spring 10*a* may be a compression spring. The actuation valve 1 may include a washer 11*a* between the spring 10*a* and the valve seal 5. In one embodiment, a spring 10*a* is used to assist biasing the valve seal 5 against the secondary valve seat 15 in combination with magnetic elements that assist to bias the valve seal 5 against the primary valve seat 2. One or both of the spring 10*a* and the magnetic elements may, in the example, assist to reseat the valve seal 5 on the primary valve seat 2 and secondary valve seat 15 after actuation. In the example of FIG. 1, the spring 10*a* is a metal spring and is a separate piece from the actuation valve. In the example of FIG. 2, the spring 10*b* is integrally formed with other parts of the actuation valve, for example the washer 11*b*.

The actuation valve 1 may include a recess 9 between the primary and secondary valve seats 2, 15. The recess 9 may receive gas from the primary valve 61 when the valve seal 5 is at least partially displaced from the primary valve seat 2, which may promote displacement of the valve seal 5 from the secondary valve seat 15. The recess 9 may partially or fully surround the primary valve seat 2. In a preferred arrangement, the recess 9 is an annular recess in the base 7, surrounding the primary valve seat 2 and surrounded by the secondary valve seat 15. This means that all gas flowing from the primary valve 61 to the secondary valve 62 will flow via or past the recess 9. The recess 9 in the preferred example has a relatively large-area open upper side such that the portion of the valve seal 5 adjacent the recess 9 is relatively large compared to the portion of the valve seal 5 adjacent the gas inlet 3. This means that, when pressurised gas flows from the gas inlet 3 to the recess 9, the force applied to the valve seal 5 may increase based on the ratio of these areas due to the relation: Force=Pressure×Area. The force may be applied relatively evenly around the valve seal 5 due to gas filling the recess 9 to a substantially uniform pressure throughout the annular recess 9. This may allow a small displacement of the valve seal 5 from the primary valve seat 2 to result in a large, rapid displacement of the valve seal 5 from the secondary valve seat 15 and large, rapid flow of gas from the gas inlet 3 and out the gas outlet 4. In an alternative arrangement, a recess 9 may be provided in the valve seal 5 and the region between the primary and secondary valves seats 2, 15 may be flat or may also include a recess. In one example, the area of the portion of the valve seal 5 adjacent the recess 9 is between about 25 and about 100 times the area of the portion of the valve seal 5 adjacent the gas inlet 3. For example, the area of the portion of the valve seal 5 adjacent the recess 9 may be approximately 50 times the area of the portion of the valve seal 5 adjacent the inlet 3.

Figure 4:
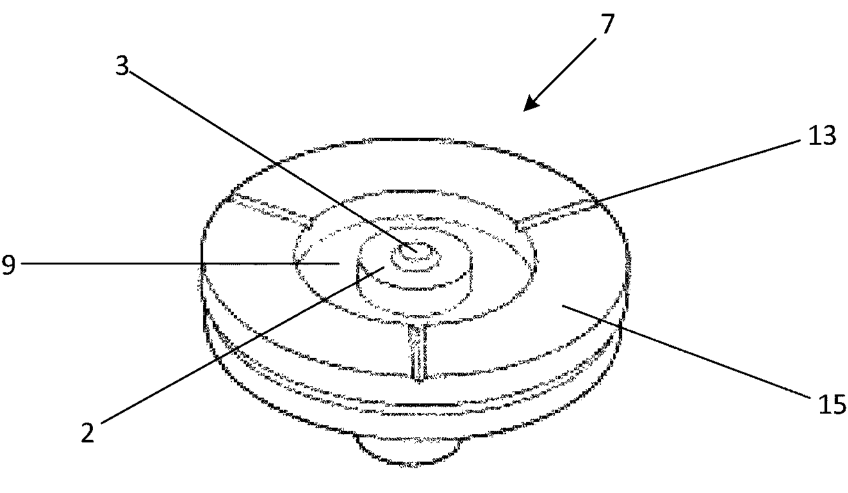
FIG. 4 shows a perspective view of an exemplary actuation valve base.

As shown in FIG. 4, there may also be provided one or more pressure equalisation flutes 13 in the base 7. These allow gas from the recess 9 to vent following actuation of the actuation valve 1 and at least partial reseating of the valve seal 5 on the secondary valve seat 15. This may reduce the pressure in the recess 9 and assist or allow reseating of the valve seal 5, especially reseating on the primary valve seat 2. In this example there are three flutes 13 with cross-sectional dimensions of 0.1 m×0.2 mm. Various combinations of numbers of flutes 13 and dimensions may be used depending on the application, for example there may be between 1 and 5 flutes. The flutes may be of any suitable dimensions. In one example, the cross sections of the flutes are between 0.1 m×0.1 mm and 1 m×1 mm. Alternatively, the base 7 of the valve may include a porous element to allow gas from the recess 9 to vent following actuation. The porous element may be located on the secondary valve seat 15 or incorporated in the valve seat 15. In one example, the porous element is a porous disk or annulus located on the valve seat. The porous annulus has an outer diameter greater than the outer diameter of the recess to allow it to sit on the secondary valve seat 15 and surround the recess 9. The porous annulus has an inner diameter greater than the outer diameter of the primary valve seat 2, or at least greater than the diameter of a knife edge or lip of the primary valve seat 2. This means that the annulus will not be located between the valve seal 5 and (at least part of) the primary valve seat, which may allow the valve seal 5 to form a substantially gas-tight seal on primary valve seat 2. A porous element may be easier to manufacture than a valve seat 15 with flutes 13 in it. It may also provide more consistent control of the gas flowing from the recess 9 than flutes in some implementations.

In one alternative example, the porous element may be located in a side of the secondary valve seat 15 itself such that a gas flow path is provided between the outer wall of the recess 9 through the valve seat 15. In another alternative example, the upper surface of the secondary valve seat 15 may provide the porous element. For example, the surface may be roughened or knurled such that it forms a less than completely gas-tight seal with the valve seal 5 to allow some flow of gas out of the recess 9. In another alternative example, the valve seal 5 may be porous at least in the region of the secondary valve seat 15. For example, the valve seal 5 may be made from disk of porous material. In this example, the valve seal may be non-porous in the region of the inlet 3 so that it can form a substantially gas-tight seal with the primary valve seat 2 while still allowing gas to flow out from the recess 9.

It will be appreciated that the flutes 13 or porous element are arranged to permit a limited amount of gas flow from the recess 9 when the secondary valve is closed. The amount of gas flow may be sufficient to allow venting of gas from the recess 9 but not so great as to prevent gas from building up behind the valve seal 5 when the primary valve 61 is at least partially opened.

The actuation valve 1 in this example includes a housing 12. The housing 12 may include holes or slots that allow outflow of the gas from the actuation valve 1 upon actuation. In the example shown, the housing 12 includes channels 78 forming part of, or leading to, the outlet 4 of the actuation valve 1.

Figure 3:
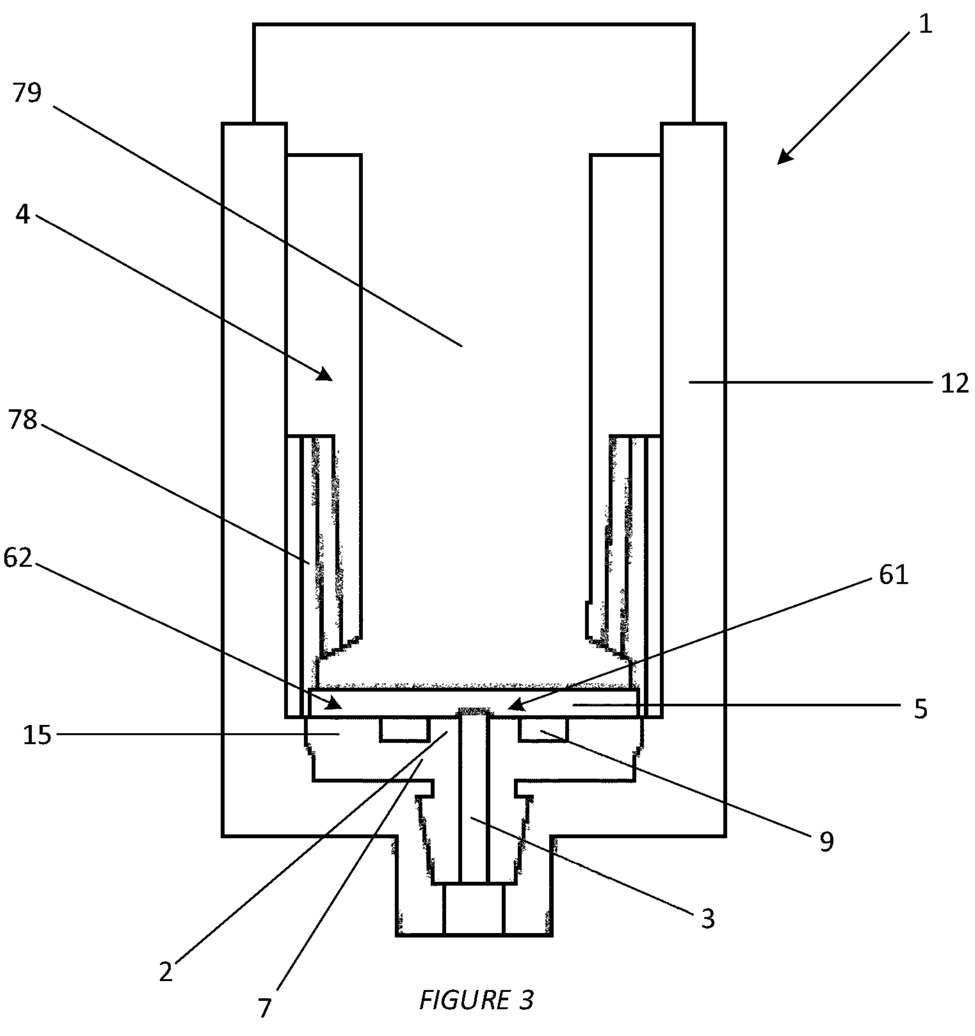
FIG. 3 shows a cross-sectional view a further alternative exemplary actuation valve.

FIG. 3 shows an example actuation valve in which the actuation arm 8 is replaced by an electronic actuator 79. The electronic actuator 79 may also replace one or more of the biasing means that bias the valve seal 5 towards the base 7. For example, the electronic actuator 79 may be a solenoid in which the armature is held against the valve seal 5 (i.e. towards the base 7) in the resting, unactuated state. To actuate the valve, current is passed through a coil of the solenoid to move the armature away from the valve seal 5 and allow the valve seal to lift from the primary and/or secondary valve seats 2, 15. In another example, the electronic actuator could be a piezo-electric transducer actuated by the application of a voltage. The use of an electronic actuator 79 may allow various different types of detectors to detect an animal other than by direct physical contact with an actuation arm. For example, an infrared or visible light camera could be used to detect a pest animal in combination with an electronic controller, and the controller could output a control signal to the electronic actuator 79 to actuate the valve 1. An electronic actuator may provide better control of the actuation valve and downstream actuation of a pest control device by requiring less precise balance of forces applied by pressurised gas at the inlet 3 and biasing means on the valve seal 5. This may allow a larger area inlet 3 to be used which may improve actuation of the pest control device.

The operation of an example actuation valve 1 of FIG. 1 is as follows. Initially, the pressurised gas is held behind the gas inlet 3 by the primary valve 61 being biased closed by magnetic attraction between the magnet 6 and the base 7 biasing the valve seal 5 against the primary valve seat 2. The recess 9, which is in communication with the environment via pressure equalisation flutes 13 and outlet 4, is approximately at atmospheric pressure. The secondary valve 62 is also closed by spring 10*a* biasing, via washer 11*a*, the valve seal 5 against the secondary valve seat 15. When the actuation arm 8 is disturbed, it tilts or lifts to reduce the force applied to the valve seal 5 in the region of the primary valve 61. The pressure of the gas at the gas inlet 3 partially or completely unseats the valve seal 5 from the primary valve seat 2, which allows gas to flow from the gas inlet 3 to the recess 9. This increases pressure in the recess 9. Pressure in the recess 9 increases until it is sufficient to lift the valve seal 5 from the secondary valve seat 15 in at least one region, thus opening the secondary valve 62 and allowing gas to vent from the inlet 3, via the primary and secondary valves, out of the outlet 4. This venting may be used to trigger actuation of a pest control device as will be detailed below.

Figure 5:
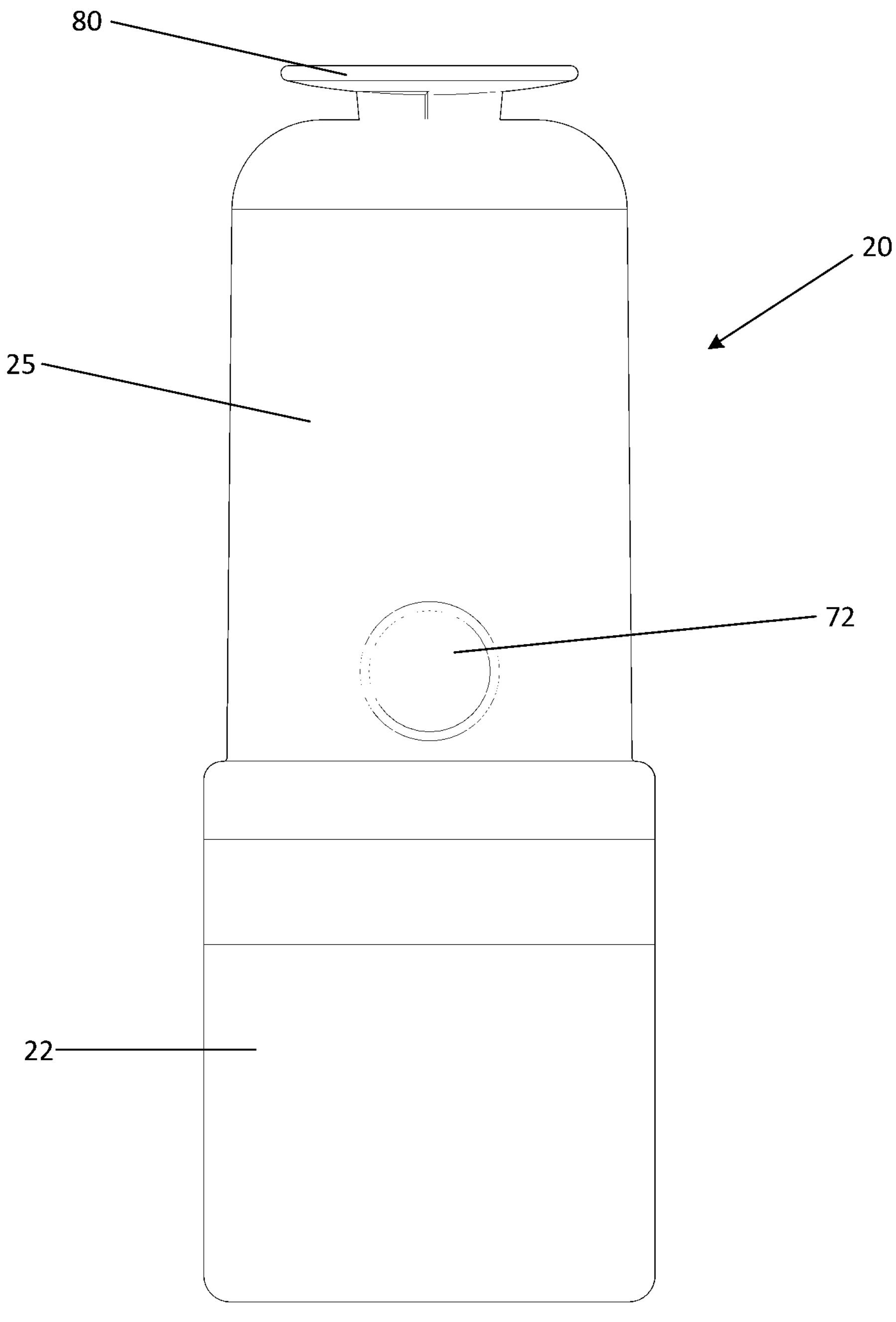
FIG. 5 shows a rear view of an exemplary pest control device.
Figure 6:
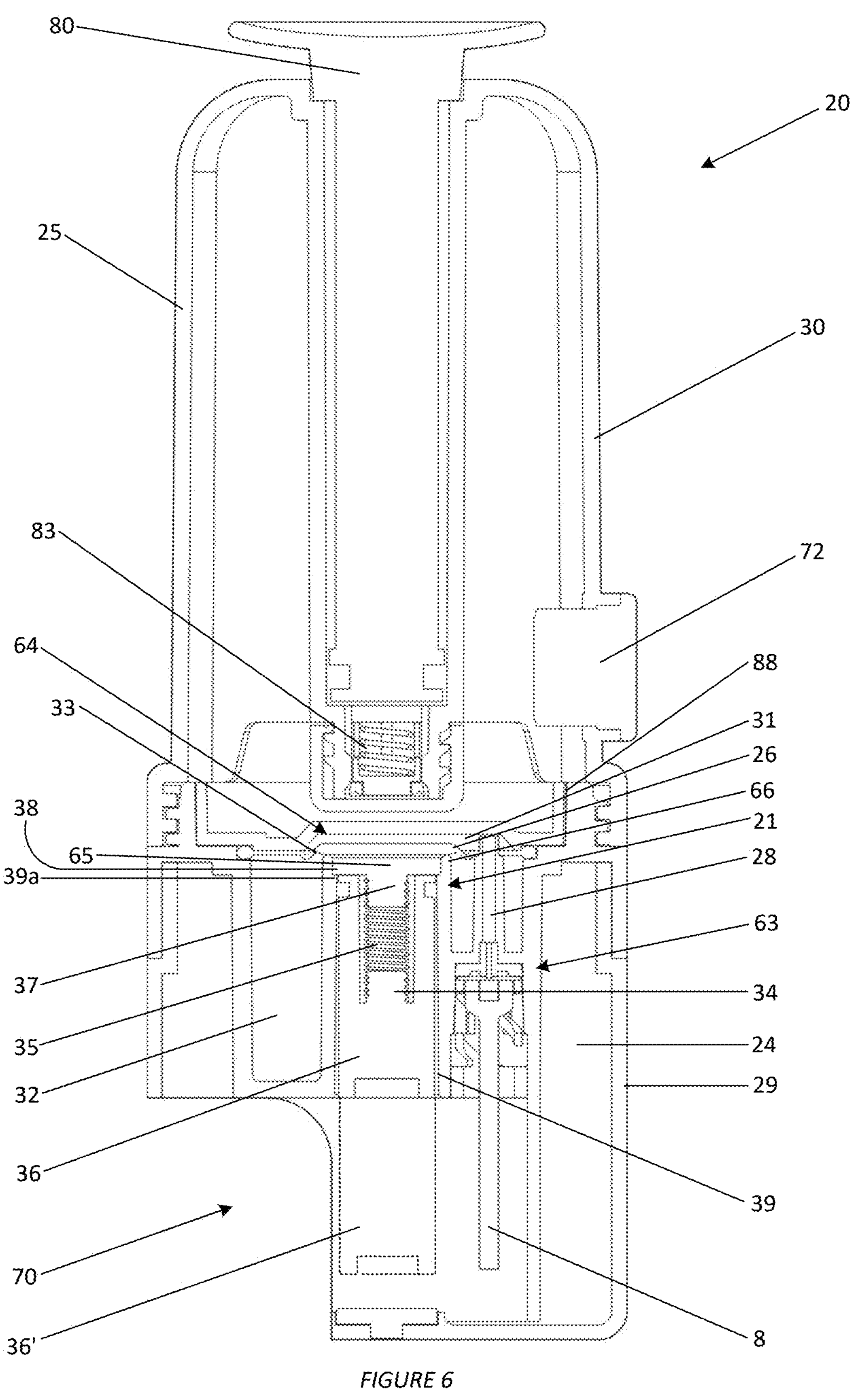
FIG. 6 shows a cross-sectional side view of an exemplary pest control device.
Figure 7:
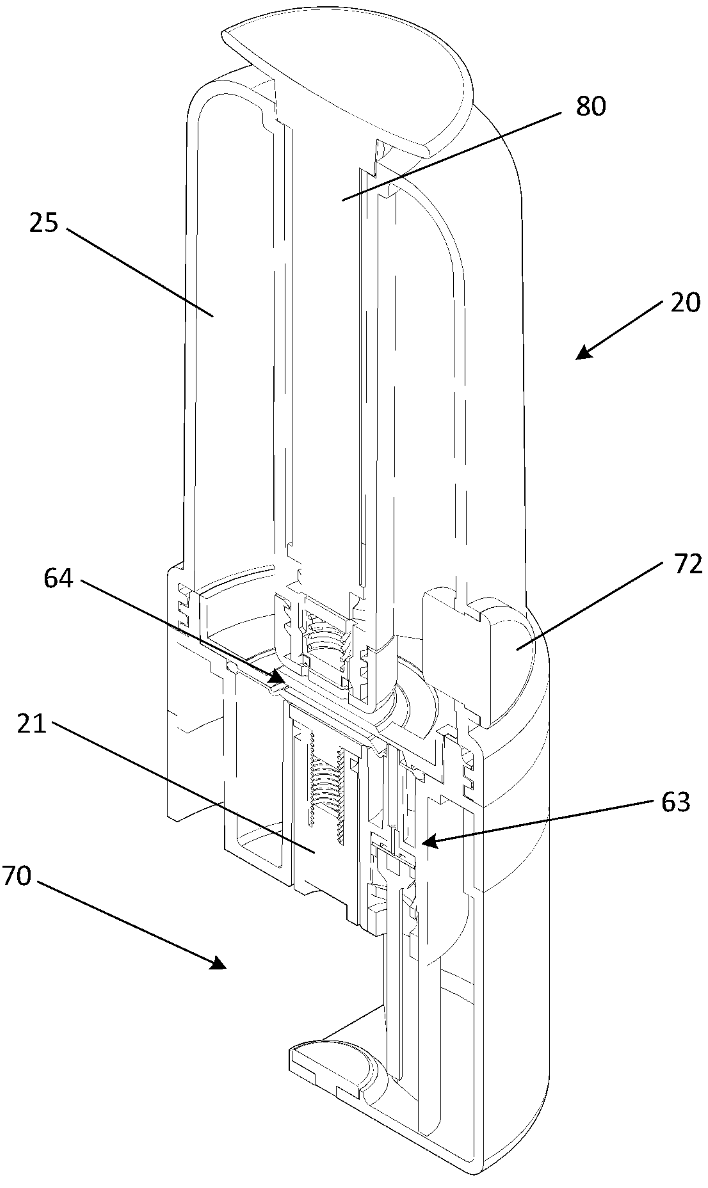
FIG. 7 shows a cross-sectional side view of an exemplary pest control device.

FIGS. 5-7 show a pneumatically actuated pest control device 20 in one example. The pest control device 20 may include an actuation valve as detailed with reference to FIGS. 1-4 or it may include a different actuation mechanism. The pest control device 20 is shown as it may be used in the field with a gas source 25, bait and a housing 22.

As best shown in FIGS. 6 and 7, in this example the pest control device housing 22 has an opening 70 that allows an animal to enter and come into contact with a trigger or otherwise be detected by a detector of the pest control device 20. In the example detailed below a trigger is provided in the form of an actuation arm 8. The pest control device 20 also includes a pneumatic actuator 21 which is arranged to be actuated upon contact of an animal with a trigger or detection of an animal by a detector. The pneumatic actuator 21 in this example includes a piston body 36 that moves through a bore 39, when actuated, to strike the animal. The broken lines in FIG. 5 indicate the piston body in its actuated position 36'. The actuation arm 8 may be located on the opposite side of the pneumatic actuator 21 from the opening 70 such that an animal travelling from the opening 70 to the actuation arm 8 will have a portion of its body under the pneumatic actuator 21 when it contacts the actuation arm 8. The spacing may be selected based on the size of a target animal. In one example, the actuation arm 8 may be laterally spaced from the piston body 36 by between about 4 mm and about 8 mm, preferably about 6 mm, in the resting (unactuated) position. In the case of mice, a spacing of about 6 mm may be effective for allowing the piston body 36 to strike the animal's skull to kill it reliably and humanely. In one example, the actuation arm 8 may be laterally spaced from the piston body 36 by between about 5 mm and about 18 mm, preferably about 10 mm, in the resting (unactuated) position. In the case of rats, a spacing of about 10 mm may be effective for allowing the piston body 36 to strike the animal's skull to kill it reliably and humanely.

The lateral deflection of at least a portion of the trigger required to trigger actuation of the pneumatic actuator may also be configured. In one example, an actuation arm 8 may be configured to trigger actuation of the pneumatic actuator when the contacted part—for example near an end of the actuation arm 8—is deflected from its resting position by between about 2 mm and about 8 mm, or between about 4 mm and about 6 mm. In the case of mice, a deflection of between about 4 mm and about 6 mm may be effective for detecting a mouse in the correct position for a reliable and effective kill. In one example, an actuation arm 8 may be configured to trigger actuation of the pneumatic actuator when the contacted part—for example near an end of the actuation arm 8—is deflected from its resting position by between about 4 mm and about 12 mm, or between about 8 mm and about 10 mm. In the case of rats, a deflection of between about 8 mm and about 10 mm may be effective for detecting a rat in the correct position for a reliable and effective kill.

The pest control device 20 may include a pest attractant, bait or lure in located in the region 24 to encourage the animal to enter. The trigger may be located between the piston body 36 and the attractant, bait or lure such that an animal traveling towards the attractant, bait or lure may come into contact with the trigger on its way towards the attractant, bait or lure. The type of attractant, bait or lure may vary depending on the situation and target animal.

Figure 8:
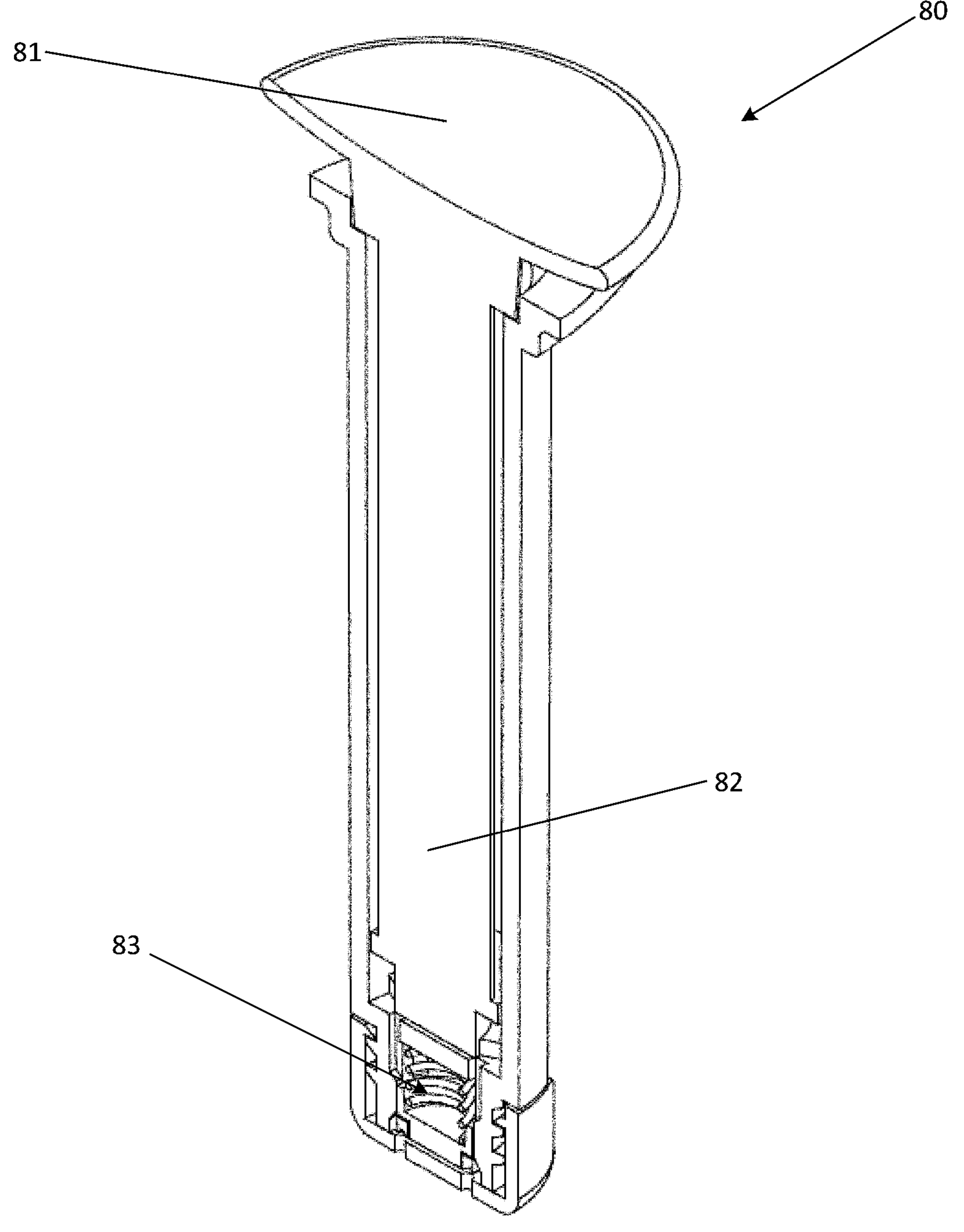
FIG. 8 shows a cross-sectional perspective view of a pump assembly.

Various types of gas source 25 may be used with the pest control device. For example, the gas source could be any volume suitable for holding enough gas for at least one actuation. For example, the gas source could be a small canister, a relatively large bottle or other generic or bespoke container. In the example of FIGS. 6 and 7, the gas source 25 is depicted as a relatively large, relatively low-pressure bottle directly attached to, or forming part of, the pest control device 20. The gas source 25 may have a volume greater than about 100 millilitres, greater than about 300 millilitres, greater than about 1000 millilitres, or greater than about 3000 millilitres. It will be appreciated that the greater the volume of the gas source, the greater the number of actuations that may be achieved for a given pressure. For example, a small gas source around 100 millilitres may enable between 1 and 5 actuations or about 2 or 3 actuations, whereas a large volume may enable many more actuations. In some examples, the gas source is sized to allow between about 15 and about 25 actuations, or about 20 actuations. The gas source 25 may include a pump 80 for allowing it to be pumped by hand up to a sufficient operating pressure. As shown in FIG. 8, the pump 80 may include a handle 81, a piston 82 and overpressure valve 83 for preventing the gas in the gas source 25 exceeding a desired value. The gas source 25 may also include an electronics module 72. The electronics module 72 may include one or more of a pressure sensor, an accelerometer, environmental sensors, communication circuitry, control circuitry and a battery, for example.

Figure 9:
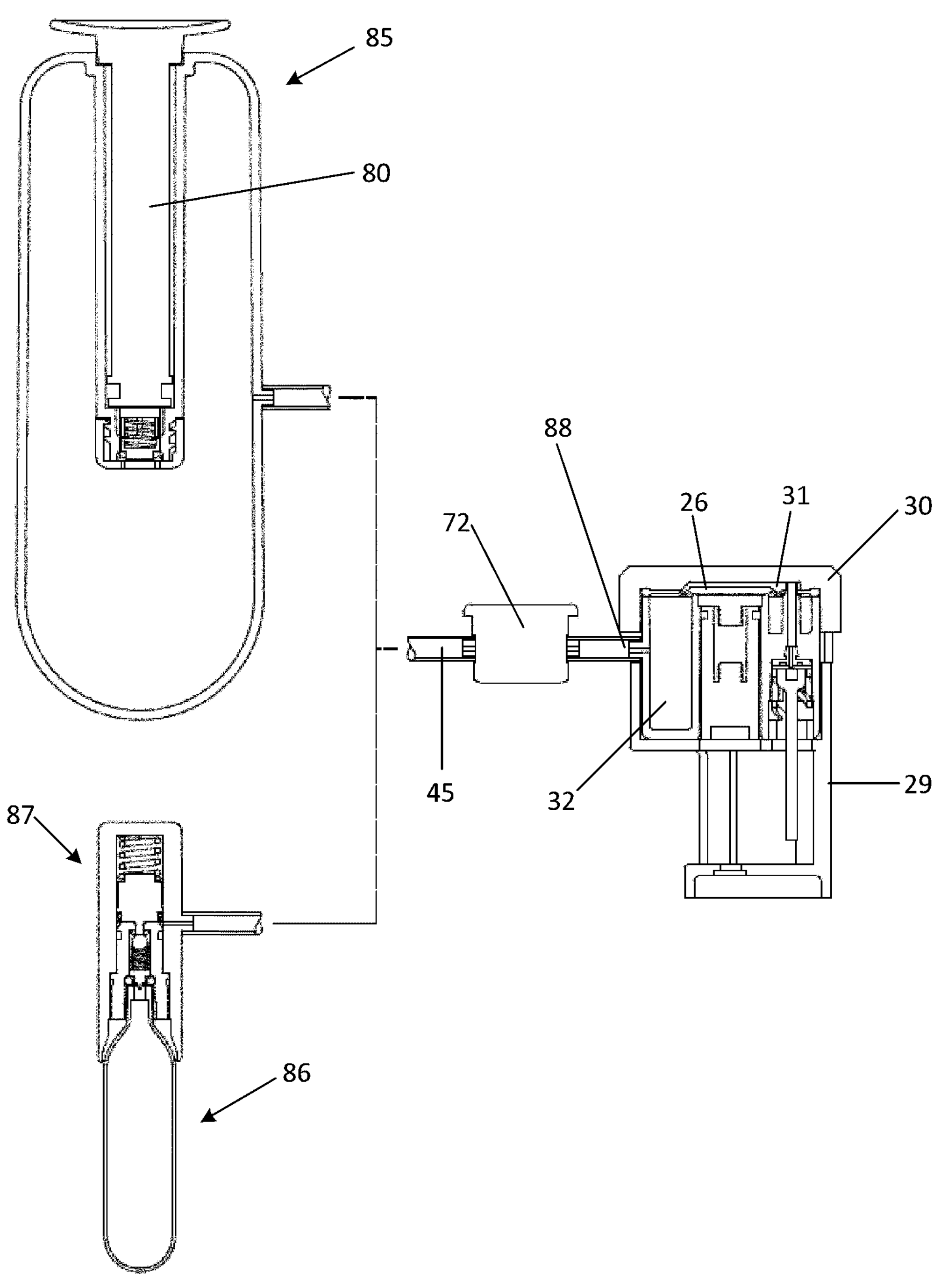
FIG. 9 shows a schematic diagram of an exemplary pest control device and gas sources.

As shown in the example of FIG. 9, the gas source 25 may be a separate gas source connected to the pest control device 20 via flow line 45. For example, the gas source 25 could be generic plastic soft drink bottle or other cheap and readily available container. Alternatively, the gas source 25 may be a dedicated bottle 85 for use with the pest control device 20 or a consumable cartridge or canister 86. The gas source 25 may be filled with gas to an operating pressure using the pump 80 or an alternative pump such as a bicycle pump or weed sprayer-type pump.

The pest control device 20 can be configured to operate with gas sources of different pressures. For example, it could be driven by gas at low pressure such as could be contained by a generic plastic bottle, or at high pressures typically found in gas canisters. The pest control device 20 may be configured to operate using gas pressurised between about 150 kPa and about 450 kPa. This pressure may be sufficient to kill target animals. It may also be low enough that gas at this pressure may be safely held in a plastic bottle or similar gas source.

The pest control device 20 or gas source 25 may be provided with a pressure regulator 87 to control the pressure of gas supplied from the gas source 25 to the pest control device. This may be particularly useful when the gas source 25 is a high-pressure gas canister 86. Alternatively, a pressure regulator may not be necessary and the gas source 25 may supply gas at a pressure that is within acceptable limits for use in the pest control device 20, for example due to operation of the overpressure valve 83.

The piston body 36 of the pest control device 20 may have a surface to which gas is applied to drive movement of the piston body 36 through the bore 39 when actuated. The application of pressurised gas to the piston body 36 results in a force on the piston body 36 and causes longitudinal movement of the piston body 36 through the bore 39. The magnitude of the force may depend on the component of the surface area of the piston body 36, to which pressurised gas is applied, orthogonal to the longitudinal direction. In one example, this area is between about 0.75 $cm^2$ and about 7 $cm^2$. In one example, this area is between about 1.5 $cm^2$ and 2.5 $cm^2$. It will be recognised that the larger this area, the greater the force applied to the piston body 36 by gas of a given pressure, or equivalently, the lower the pressure required to achieve a given force on the piston body 36.

In one example, the pest control device 20 is configured to apply a force of between about 20 N and 200 N to the piston body 36. In one example, the pest control device 20 is configured to apply a force of between about 24 N and about 76 N to the piston body 36. A force of between about 24 N and about 76 N. may be particularly useful for killing small pests such as mice. A force of between about 50 N and about 200 N may be particularly useful for killing somewhat larger pests such as rats.

FIG. 6 shows a cross section of the pneumatic mechanism of an example pneumatically actuated pest control device 20 in detail. The pest control device 20 in this example includes a pneumatic actuator 21, a first valve 63, a second valve 64, a gas inlet 88 and first and second volumes 31, 32. In this example the gas inlet (only partially visible in FIG. 6) forms a gas communication path from gas source 25 to the second volume 32. The inlet 88 allows flow of gas from a reservoir within the gas source 25 to the rest of the pest control device 20. Various types of first valve 63 may be used. In one example, the first valve 63 may be an actuation valve as described with reference to FIGS. 1 and 2. The first valve 63 may control flow of gas from the first volume 31 to the exterior of the device. The first volume 31 may be located adjacent a valve seal 26 of the second valve 64.

The second valve 64 includes a valve seat 66 and a valve seal 26 that separates the second volume 32 from the pneumatic actuator 21 when seated. In this example, the valve seal 26 is a flexible seal. The flexible seal may be made of rubber or other flexible material. The valve seal 26 may have a small bleed hole 33 for allowing limited gas communication between the first volume 31 and the second volume 32. The bleed hole may be any size suitable for allowing gas flow from the second volume 32 to the first volume 31 at a rate that is low enough to still allow unseating of the valve seal 26 during actuation. In one example, the diameter of the bleed hole 33 may be less than 1 mm.

The valve seal 26 may have a hole for allowing the pipe 28 to pass through the valve seal 26 and allow gas flow from the first volume 31 to the first valve 63 when the first valve 63 is opened. The first valve 63 is arranged to control flow of gas from the first volume 31, via the pipe 28, out of the pest control device 20 (for example into the environment). The valve seal 26 is biased into the closed position in the normal, unactuated state.

In this example, the pneumatic actuator includes a piston assembly that includes a piston body 36 that moves through a bore 39 when pressurised gas is applied to one side and a base 65. The piston assembly may include a spring 35 to retract the piston body 36 to a resting position after actuation. During actuation, the piston body 36 may move longitudinally away from the resting position. The spring 35 can extend during this movement such that, in the actuated position 36', the spring 35 provides a restoring force to return the piston body 36 to the resting position. The spring 35 may be an extension spring, although a compression spring could also be employed with suitable modification. In one example, the piston body 36 includes cavity and the spring 35 is connected within, and resides at least partially within, the cavity of the piston body 36. This may assist handling of the piston body 36 or piston assembly during manufacture and assembly because the enclosed springs may not become entangled with each other. This may be particularly useful for automated assembly situations where dealing with springs is particularly challenging for robotic grippers and assembly devices. The spring 35 may be an extension spring in which coils are substantially adjacent each other in the fully retracted state. The spring may then present a substantially closed surface formed by the coils. This may assist handling of springs during manufacture and assembly because the substantially closed surfaces of the springs may not become entangled with each other. One end of the spring 35 may be connected to the piston body 36 inside the cavity and the other end of the spring 35 may be connected to a piston base 65 that does not move through the bore 39 during actuation. In the example shown, the piston base 65 includes an elongate portion 37 that extends at least partly into the cavity of the piston body 36 in the unactuated state and retains the spring 35, and a flange 38 that sits on a retaining shelf **39*a* forming part of the bore 39. The flange 38 includes openings for allowing gas to pass from the second volume 32 to the piston body 36 when the second valve 64 is opened. The piston body 36 may include an elongate portion within the cavity to retain the spring. One or both of the elongate portions of the base 65 and the piston body 36 may have screw threads suitably dimensioned for the spring 35** to screw onto.

The pest control device 20 may include a two-piece housing. The two-piece housing may include a lower housing 29 and an upper housing 30. In the example of FIGS. 5-7, the gas bottle may act as, or may include, the upper housing 30. The lower housing 29 and upper housing 30 may, when connected to each other, enclose one or more of the first volume 31, the second volume 32, the first valve 63 and the second valve 64. The lower housing 29 and upper housing 30 may screw directly to each other or may include threaded portions for receiving screws to screw the housings together. Alternatively, they may have snap-fit or other suitable couplings. The valve seal 26 of the second valve 64 may provide a seal between the lower housing 29 and upper housing 30. The valve seal may have a thicker portion at its outer edge to provide this seal. In this example, the valve seal 26 of the second valve 64 is circular and has a thicker portion at its circumference to provide an O-ring-type seal between the lower and upper housings 29, 30. In this example, the lower housing 29 and upper housing 30 enclose the first volume 31, second volume 32 and second valve 64. The first valve 63 is located in a recess on the underside of the lower housing 29.

The pest control device 20 may include one or more safety devices for preventing actuation of the actuator 21 at pressures above or below a desired range. The safety devices can include an over-pressure safety device and/or an under-pressure safety device. The safety device(s) may ensure humane and effective killing of animals. The safety devices may ensure correct and reliable operation of the pest control device.

The over-pressure safety device can be arranged to release gas from one or more volumes when pressure exceeds an upper threshold. In one example, the over-pressure safety device is the overpressure valve 83. In one example, the overpressure valve 83 is part of the gas source 25. In another example, overpressure safety devices is part of the pest control device 20 and acts as a pressure-relief valve. In one example, the first valve 63 of the pest control device 20 may act as a pressure relief valve by venting gas from the device 20 when pressure in the first volume 31 it is at a pressure sufficient to overcome the bias holding the valve seal 5 on the primary valve seat 2 and at least partially open the valve 63.

The under-pressure safety device may be arranged to prevent actuation of the actuator 21 when pressure is below a lower threshold. For example, the pest control device 20, gas source 25 or gas flow line 45 may include an electronic pressure sensor connected to a solenoid actuator that selectively prevents or allows movement of the pneumatic actuator 21. When the sensor detects that pressure is below a lower threshold, the solenoid can move to cause a catch to engage with the pneumatic actuator 21, preventing movement thereof. When the sensor detects that pressure is above the lower threshold, the solenoid can move to release the catch and allow movement of the pneumatic actuator 21. In one example, the pressure sensor could be located in the electronics module 72. In another example, the under-pressure safety device may be in the form of a protrusion in the bore 39 through which the pneumatic actuator moves. For example, the protrusion may be a spring-loaded detent that is biased into a bore of the pneumatic actuator. The protrusion may have one side at a relatively steep angle to the wall of the bore arranged to face the distal end of a piston body 36 of the pneumatic actuator or a distal surface of a recess in the piston body 36. The side with the steep angle can be arranged to bear against the distal end of the piston body 36 or the surface of the recess to block movement of the piston body through the bore when the pressure driving the piston body is less than the lower threshold. When the pressure is higher than the threshold, the piston body 36 can overcome the bias of the spring, push the detent out of the blocking position in the bore 39 and move through the bore 39. Once the piston body 36 returns to its unactuated position, the detent can move back into a blocking position in the bore 39.

In another arrangement, the first valve 63 may be an electronic valve, for example as described in connection with FIG. 3. In this arrangement, a pressure sensor in the pest control device 20, gas source 25 or flow line 45 may provide a signal indicative of gas pressure to the controller that controls operation of the electronic actuator 79. The controller can be configured to only actuate the electronic actuator 79, and hence the pneumatic actuator 21, when gas pressure is within an acceptable range.

The operation of the pest control device 20 in one example may be as follows. Initially, the first and second valves 63, 64 are closed and gas is provided from a gas source 25 to the second volume 32 via the inlet 88. Gas is also provided from the second volume 32 to the first volume 31 via the bleed hole 33. The first and second volumes 31, 32 fill with pressurised gas and come to approximately the same pressure. In this state, the pest control device 20 is set for actuation. When the first valve 63 is opened, gas is vented from the first volume 31 via the pipe 28 faster than it can be replaced by gas flowing from the second volume 32 via the bleed hole 33. This reduces the pressure behind the valve seal 26 of the second valve 64 and causes the valve seal 26 to lift from the valve seat 66 of the second valve 64 due to the pressure imbalance, opening the second valve 64. When the valve seal 26 lifts from the valve seat 66, the second volume 32 is no longer separated from the pneumatic actuator 21 and gas flows from the second volume 32 to the actuator 21 and drives the piston body 36 downwards through the bore 39 to position 36'. In a preferred use, the piston body 36 is arranged to strike and kill an animal.

It will be noted that, due to the gas inlet 88 being connected to the second volume 32, gas entering the pest control device 20 during actuation will tend maintain the gas in the second volume 32 at a higher pressure than gas in the first volume 31 during at least part of the actuation. This is due to gas flowing from the gas source 25 through the inlet to the second volume 32 faster than gas flows from the second volume 32 through the bleed hole 33 to the first volume 31. This may assist opening of the second valve 64 and reliable and quick actuation of the pneumatic actuator 21.

After actuation, the piston body 36 of the actuator 21 returns towards its resting position by action of the spring 35, and the first valve 63 and second valve 64 close, which allows the first and second volumes 31, 32 to re-pressurise and reset the pest control device 20. The inlet 88 may be configured to allow gas to fill the second volume 32 at a relatively low rate. In particular, the dimensions of the inlet 88 may be selected relative to the dimensions of the bleed hole 33 such that the rate at which gas fills the second volume 32 is not too high compared to the rate at which gas flows from the second volume 32, via the bleed hole 33, into the first volume 31. This may ensure that the pressure in the second volume 32 does not exceed pressure in the first volume 31 by too great a value and thus may assist reseating of the valve seal 26 and closure of the second valve 64 after actuation.

Figure 10:
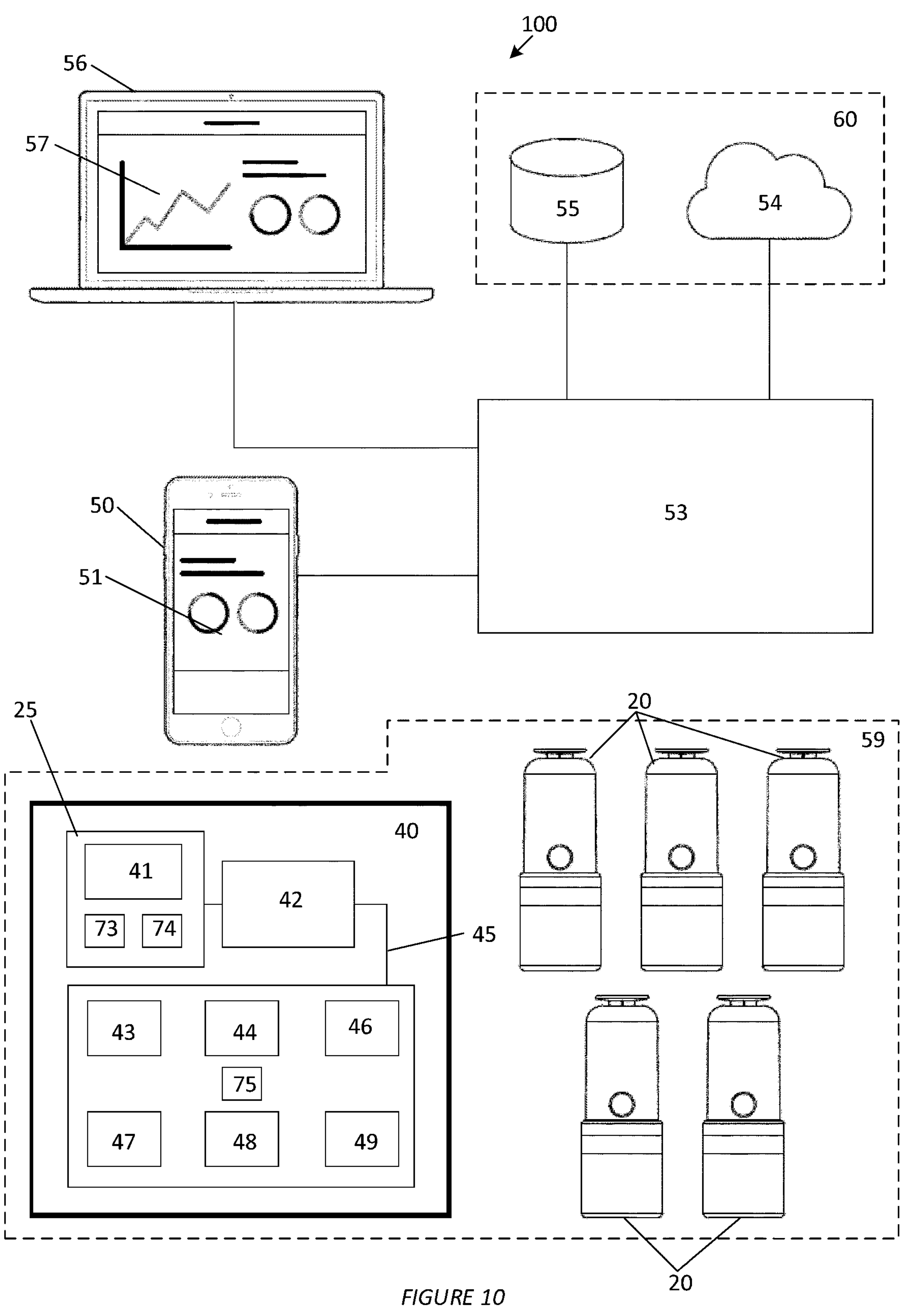
FIG. 10 shows a schematic diagram of an exemplary pest control device information and monitoring system.

As shown in FIG. 10, for example, pest control device 20 may include electronics including sensors, 42 and 49, communication circuitry 46, control circuitry 44, a battery 48 and memory 47 (shown in beacon pest control device 40 in the example of FIG. 10). For example, one or more pressure sensors 42 may be provided in the flow path of gas from the gas source 25 to the pneumatic actuator 21. This may be in the first or second volume 31, 32 or in a gas supply line 45 from the gas source 25 to the inlet 88. Alternatively or additionally, one or more pressure sensors 41 may be provided in a gas source 25 such as a gas bottle, or in a fitting of the gas source 25.

The pressure sensor(s) 41, 42 may be used to sense actuation or proper functioning of the pest control device 20. For example, a sudden drop in pressure from the normal pressure in the set state to a lower value followed by an increase back to the normal pressure may indicate actuation of the pneumatic actuator 21. As another example, a drop in pressure that is not followed by an increase may indicate disconnection of the gas source or failure of a part in the flow path. As a further example, a slow, gradual decrease in pressure may indicate a leak in the flow path or improper closure of a valve.

The pest control device 20 may also include an accelerometer 43 which may detect actuation of the pneumatic actuator 21 from characteristic accelerations when the piston body 36 is propelled by the gas. Environmental sensors 49 such as temperature and light or infrared sensors may be provided.

The electronics may also include control circuitry 44 that periodically polls the sensor(s) 41, 42, 43 and 49 for readings and/or receives readings upon the detection of significant events by the sensor(s) 41, 42, 43 and 49, depending on the types of sensors provided. For example, environmental sensors 49 such as temperature sensors may be polled periodically for readings whereas event sensors such as accelerometers 43 may report any reading higher than a significance or sensitivity threshold as it is detected.

The sensors 41, 42, 43, 49 may be in wired or wireless communication with the control circuitry 44. In one example, the accelerometer 43, control circuitry 44, memory 47 and communication circuitry 46 are provided on a circuit board and the battery 48 is retained in or on the circuit board. The pressure sensors 41, 42 may be separate from the circuit board and communicate with the control circuitry 44 via an antenna of the communication circuitry 46 or via wired connections. For example, the pressure sensors 41, 42 may communicate using an NFC or far-field radio antenna with a corresponding antenna of the communication circuitry 46. The communication may use NFC, Bluetooth or WiFi protocols.

The pest control device 20 may collect and report functional and environmental information and report it to consumers, pest control officers or other parties. The information may be collected directly from the pest control device 20 or reported through a pest control information and monitoring system. The collected and reported information could include a count of actuations, number of actuations remaining, a detected error or unexpected occurrence and current gas source pressure, for example.

The control circuitry 44 may be configured to control operation of the pest control device 20 based on data sensed by the sensors. For example, the control circuitry could prevent actuation of the pneumatic actuator when sensed gas pressure is below a threshold. In one example, the threshold could be an estimated lower limit required for humane killing of an animal. In one example, the control circuitry may prevent actuation when the pressure is below about 150 kPa.

The pest control device 20 or the gas source 25 may also include one or more indicators 74, 75 for providing information to a user. The indicator may be operatively connected to one or more of the sensors. For example. the indicator 74, 75 may be operatively connected to the pressure sensor 41, 42 to indicate that pressure is outside a predetermined range. The indicator 74, 75 may indicate when the pressure is insufficient for proper actuation of the pest control device 20 and/or above an upper limit for the pest control device 20 or gas source 25. In one example, the indicator may indicate when the pressure is below about 150 kPa. In another example, the indicator may indicate when the pressure is above about 450 kPa. The indicator may be operatively connected to control circuitry 44, 73 to control its operation.

The indicator 74, 75 could be any indicator suitable for indicating information to a user. For example, it could be a visual indicator such as a light or an audio indicator such as a buzzer.

An example pest control information and monitoring system 100 is shown in FIG. 10. The system 100 includes several pest control devices 20, a mobile computing device 50, a cloud server 54 and/or a dedicated physical server 55, a user computing device 56 and a wide area network (WAN) 53.

In one example, the pest control devices 20 form a pest control device network 59. This may be a mesh network that allows bi-directional communication between any pest control devices 20 that are within range of each other. The pest control devices 20 may communicate with each other via Bluetooth using their respective communication circuitry. One or more of the pest control devices 20 is configured as a beacon 40 that communicates information about the pest control devices 20 in the network 59. The beacon 40 may be a Bluetooth beacon that broadcasts its identifier to any compatible device within range. Each pest control device 20 may transmit its own information as well as rebroadcast information received from other pest control devices 20 to form a mesh network. This allows the information to propagate throughout the pest control device network 59 until it reaches the beacon 40. The beacon 40 may then transmit this information to a compatible mobile computing device 50 when it is brought into range. The pest control devices 20 may communicate with a mobile computing device 50 using Bluetooth or NFC communications.

The pest control network may include a plurality of short-range units and one or more long-range units. The short-range units may communicate using a relatively short-range communication technology such as Bluetooth. The long-range unit(s) may communicate using a relatively long-range communication technology such as radio communications or a wired communication. The long-range unit(s) may have a direct or indirect connection to the internet, for example via a mobile phone network or a wired communication network. This may allow pest control device information to be collected without the need for a user to take a mobile computing device near to the long-range unit(s). In one example, one or more beacon(s) 40 may be long-range units and the other pest control devices may be short-range units.

In one example, a plurality of beacons 40 may be provided. In this example, the beacon(s) 40 may be located in relatively accessible locations, whereas the other pest control devices 20 need not be accessible.

Alternative arrangements of the pest control device network 59 may also be used. For example, the network 59 may be structured such as in a star or tree network with the beacon 40 as the hub or root node. Any number of the pest control devices 20 may be configured as beacons 40, for example all of the pest control devices 20 could be beacons 40 to enable the pest control device information to be collected from any node of the network 59.

The mobile computing device 50 could be a mobile phone or tablet with wireless communications circuitry 52. In one example, the mobile computing device 50 is a Bluetooth-enabled mobile phone. The mobile computing device 50 may have installed on it a pest control application 51. The pest control application 51 may collect pest control device information from a beacon 40 when communications are established. The mobile computing apparatus may also connect to a wide area network 53 such as the internet to transmit collected pest control information. This connection may be via a wireless communication link, for example to a WiFi access point or a cellular communication network, or via a wired communication link.

The pest control information may then be communicated to a backend system 60 which includes the cloud server 54 and/or the dedicated physical server 55. The server(s) 54, 55 store the collected pest control information. They may also make it accessible to the user computing device 56 having communication circuitry 52. The user computing device 56 may have a pest control application 57 installed on it, which may communicate with the backend system 60 to collect pest control information. Alternatively, the user computing device 56 may access the pest control information using a web browser without the need for a pest control application 57. The user computing device 56 may be, for example, a mobile phone, a tablet computer, a laptop computer or a desktop computer. The actuation valves described may have improved sensitivity to small forces. This may make them particularly suitable for targeting small pest animals such as mice and rats.

The pest control devices described may allow fast actuation and/or reduce the amount of noise produced during actuation. This may result in better kill/capture rates.

The pest control devices described may ensure the pest animal is correctly positioned when the device is actuated to improve kill or capture rates.

The pest control devices may be powered by relatively large, low volume gas sources which may reduce waste and/or expense and/or inconvenience.

The pest control devices may sense operational and/or other information for improved monitoring of the pest control devices.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A pneumatically actuated pest control device comprising:

a housing having an opening defined therein, the opening configured to allow a pest to access a region within the pest control device;

a pneumatic actuator within the housing configured to strike the pest in the region when actuated;

a detector within the housing configured to detect the pest in the region;

a first valve within the housing to control gas flow from a first volume;

a second valve within the housing to control gas flow from a second volume to the pneumatic actuator, the second valve including a valve seat and a valve seal that separates the second volume from the pneumatic actuator when the valve seal is seated on the valve seat, wherein there is no intermediate reservoir in a flow path between the second volume and the pneumatic actuator; and a gas inlet within the housing to supply pressurised gas from a gas reservoir to the second volume, wherein the gas inlet opens into the second volume, wherein the second volume is upstream of the first volume such that the pressurised gas is supplied from the second volume to the first volume, wherein upon the detector detecting the pest in the region, the first valve is actuated, and wherein upon activation of the first valve, gas flows out of the first volume via the first valve which allows the valve seal of the second valve to be unseated from the valve seat of the second valve such that gas flows from the second volume to the pneumatic actuator via the second valve to actuate the pneumatic actuator.

2. A pneumatically actuated pest control device as claimed in claim 1 wherein:

the gas reservoir includes a pump to pressurise the reservoir using surrounding air.

3. A pneumatically actuated pest control device as claimed in claim 2 wherein the pump is a hand operated pump.

4. A pneumatically actuated pest control device as claimed in claim 2 further comprising:
a housing;
wherein the pressurised gas reservoir is incorporated into at least part of the housing.

5. A pneumatically actuated pest control device as claimed in claim 4 wherein the housing is a two-piece housing.

6. A pneumatically actuated pest control device as claimed in claim 2 further comprising:
a pressure sensor to sense gas pressure in the gas reservoir or in a flow line between the gas reservoir and the pneumatic actuator; and
control circuitry operatively connected to the pressure sensor and configured to determine actuation or proper functioning of the pest control device.

7. A pest control device according to claim 6 further comprising communication circuitry operatively connected to the control circuitry.

8. A pest control device according to claim 2 further comprising control circuitry configured to prevent actuation of the pneumatic actuator of the pest control device during a prescribed condition.

9. A pest control device according to claim 8 wherein the prescribed condition is determined based on a comparison of a value to a threshold.

10. A pest control device according to claim 9 wherein the prescribed condition is when the pressure sensor indicates that the pressure of the gas is below a first threshold.

11. A pest control device according to claim 2 wherein the gas reservoir has a volume greater than 100 millilitres, greater than about 300 millilitres, greater than about 1000 millilitres, or greater than about 3000 millilitres.

12. A pest control device as claimed in claim 11 wherein the pneumatic actuator can be powered by compressed gas between 150 kPa and 450 kPa.

13. A pest control device as claimed in claim 2 wherein the first valve further comprises an electromechanically actuated valve that controls actuation of the pneumatic actuator.

14. A pest control device as claimed in claim 13 wherein the electromechanically actuated valve controls the gas flow from the first volume, wherein upon actuation of the electromechanically actuated valve, the gas flows out of the first volume via the electromechanically actuated valve which allows the second valve to unseat the valve seal such that the gas flows from the second volume to the pneumatic actuator via the second valve.

15. A pest control device as claimed in claim 13 wherein the electromechanically actuated valve is a solenoid valve or a piezo-electric valve.

16. A pest control device as claimed in claim 2 wherein the gas reservoir is a gas bottle connected to the rest of the pest control device by a gas line.

17. A pneumatically actuated pest control device as claimed in claim 1 wherein the housing is a two-piece housing wherein the gas reservoir is incorporated into at least part of the housing and wherein the housing includes a lower housing and an upper housing that, when connected to each other, enclose the first volume, second volume and second valve.

18. A pneumatically actuated pest control device as claimed in claim 17, wherein the valve seal provides a seal between the lower housing and upper housing when connected to each other.

19. A pneumatically actuated pest control device as claimed in claim 1 wherein:
the gas reservoir is incorporated into at least part of the housing.

20. A pest control device as claimed in claim 1 wherein the pneumatic actuator comprises a piston body and wherein the pneumatic actuator is configured to strike the pest with the piston body.

* * * * *